April 3, 1951 A. R. HAVENS 2,547,004

PULSE GENERATING DEVICE

Filed Aug. 1, 1946

INVENTOR
ARTHUR R. HAVENS

BY [signature]

ATTORNEY

Patented Apr. 3, 1951

2,547,004

UNITED STATES PATENT OFFICE 2,547,004

PULSE GENERATING DEVICE

Arthur R. Havens, Fort Wayne, Ind., assignor, by mesne assignments, to Farnsworth Research Corporation, a corporation of Indiana Application August 1, 1946, Serial No. 687,636

4 Claims. (Cl. 250—36)

Figure 1:
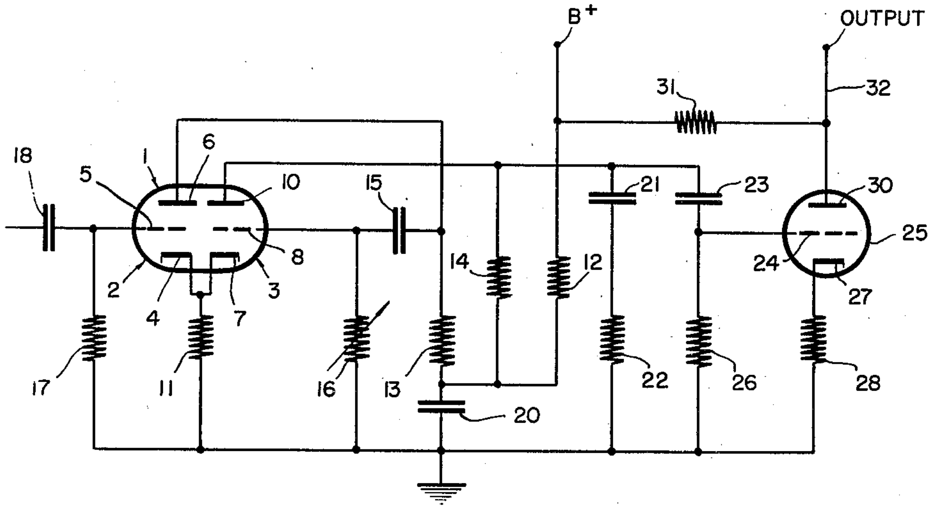

This invention relates generally to pulse generators, and more particularly relates to a pulse generator which will develop two output pulses upon being triggered by an input pulse.

It is conventional television practice to provide a relaxation oscillator such as a multivibrator which is triggered by synchronizing pulses for developing an output signal at a predetermined frequency. The multivibrator is usually self-oscillating and its natural frequency preferably is lower than the frequency of the synchronizing pulses. Accordingly, the synchronizing pulses occur before the end of a natural cycle of operation of the multivibrator thereby to force the impulse generator to fall in step with the synchronizing frequency. The multivibrator accordingly operates at a frequency which is higher than its natural frequency. This is considered the desirable type of operation of a foreign driven multivibrator. When the natural frequency of the multivibrator is higher than the synchronizing frequency, the multivibrator is forced to operate at a frequency which is lower than its natural frequency so that the period between successive pulses is lengthened by the synchronizing action. In such a case the synchronizing action is not positive as explained, for example, on pages 156 to 158 of "Principles of Television Engineering" by Donald G. Fink published by McGraw-Hill Book Company, Inc., New York, 1940. A multivibrator which is synchronized in the conventional manner therefore operates at a forced frequency which is usually different from its natural frequency and develops one output pulse upon being triggered by a synchronizing pulse.

It is sometimes desirable to provide a pulse generator which will develop two output pulses when the generator is triggered by one input pulse. In certain radar transmitters, for example, a signal is required which comprises two pulses spaced by a very short time interval. For this purpose there is conventionally provided a time delay circuit which will develop an output pulse spaced by a predetermined time interval from the input pulse. Delay circuits of this type, however, become bulky and inconvenient when the time interval between the two pulses is appreciably larger than approximately one microsecond.

Furthermore, in a television transmitter a timing generator is conventionally employed for developing synchronizing signals including equalizing pulses occurring during the vertical blanking period. The various synchronizing signals have different frequencies and pulse widths.

These synchronizing pulses may be developed by providing a number of pulse generators which are all synchronized from the same source and which develop output pulses of different frequencies. Wave-shaping and time delay circuits are usually required for providing the proper phase and pulse width of the various synchronizing pulses. Accordingly, a television timing generator which is exceedingly complicated could be considerably simplified by providing a pulse generator which will develop two output pulses in response to one input pulse.

It is the principal object of the present invention, therefore, to provide a pulse generator which may comprise a relaxation generator, such as a multivibrator, which will develop two output pulses in response to one input pulse.

Another object of the invention is to provide a self-oscillating multivibrator which has a natural frequency which is higher than that of the input pulses impressed thereon so that an input pulse will trigger the multivibrator to initiate a cycle of operation at the end of which another output pulse is developed before the multivibrator is triggered again by the succeeding input pulses.

A further object of the invention is to provide a pulse generator which upon being triggered by an input pulse will develop two output pulses spaced by any desired time interval.

In accordance with the present invention there is provided a pulse generator comprising a self-oscillating relaxation oscillator, such as a multivibrator, arranged to develop output pulses of a time duration which is short against a cycle of operation of the oscillator. Means are further provided for impressing input pulses upon the oscillator. The frequency of the input pulses is lower than the natural frequency of the oscillator. Finally, means are provided for developing an output signal comprising two groups of pulses. A pulse of one of the groups is developed in response to one of the input pulses and a succeeding pulse of the other one of the groups is developed at the end of the cycle of operation.

For a better understanding of the invention, together with other and further objects thereof, reference is made to the following description, taken in connection with the accompanying drawing, and its scope will be pointed out in the appended claims.

Figure 2:
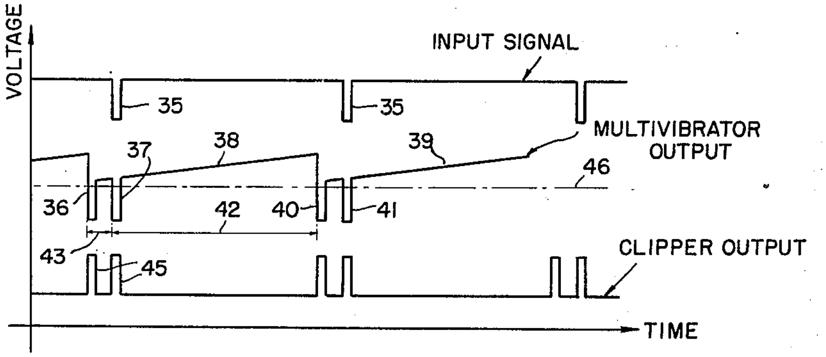

In the accompanying drawing, Fig. 1 is a circuit diagram of a pulse generator embodying the present invention, while Fig. 2 is a graph illustrating voltages plotted against time and developed at certain points of the pulse generator of Fig. 1.

Referring to Fig. 1 of the drawing, there is illustrated a pulse generator which includes multivibrator 1 which may comprise a twin tube, as illustrated, having tube sections 2 and 3. Tube section 2 comprises cathode 4, control grid 5 and anode 6, while tube section 3 includes cathode 7, control grid 8 and anode 10. Cathodes 4 and 7 of the two tube sections are tied together and connected to ground through common cathode resistor 11. Anode 6 is connected to a suitable anode voltage supply indicated at B+ through resistor 12 and anode resistor 13 arranged in series. Anode 10 is connected to the positive voltage supply B+ through resistor 12 and anode resistor 14. For a purpose to be explained hereinafter, the resistance of anode resistor 14 may be approximately ten times that of anode resistor 13.

Control grid 8 of tube section 3 is coupled to anode 6 of tube section 2 through coupling condenser 15. Both tube sections 2 and 3 are furthermore coupled together through common cathode resistor 11. Variable grid leak resistor 16 connects control grid 8 to ground. Control grid 5 of tube section 2 is also connected to ground through grid leak resistor 17, and an input signal may be impressed upon control grid 5 through coupling condenser 18. Bypass condenser 20 is arranged between the junction point of resistor 12 and anode resistors 13, 14 and ground for providing an alternating current bypass.

Condenser 21 and resistor 22 arranged in series between anode 10 and ground form a wave-shaping network. Coupling condenser 23 couples the output signal developed across anode resistor 14 and the wave-shaping network consisting of condenser 21 and resistor 22 into control grid 24 of clipper and amplifier 25. Control grid 24 of clipper 25 is provided with grid leak resistor 26. Cathode 27 of clipper 25 is connected to ground through cathode resistor 28 while anode 30 is connected to the anode voltage supply B+ through anode resistor 31. The output signal may be obtained from output lead 32.

Multivibrator 1 which is arranged to be self-oscillating operates as follows. Let it be assumed that tube section 2 begins to conduct space current. Accordingly, the current flowing through anode resistor 13 will develop a voltage drop thereacross which is impressed upon control grid 8 of tube section 3 through coupling condenser 15 thereby cutting off tube section 3. The negative charge impressed upon coupling condenser 15 is gradually dissipated to ground through variable grid leak resistor 16. The time of conduction of tube section 2 is determined by the time constant of condenser 15 and resistor 16 and may be controlled by adjusting resistor 16.

The potential of control grid 8 of tube section 3 gradually approaches its cut-off value so that eventually space current begins to flow through tube section 3. During the period of time tube section 2 is conductive, condensers 21 and 23 are gradually charged from voltage supply B+ through resistors 12 and 14. When tube section 3 begins to conduct space current, the combined current of both tube sections now flowing through cathode resistor 11 will raise the potential of cathodes 4 and 7. This, in turn, will terminate the flow of space current through tube section 2. At this time the voltage of anode 6 rises and consequently a positive voltage is impressed upon control grid 8 through coupling condenser 15 which will further increase the space current through tube section 3 while tube section 2 remains cut off.

The space current flowing through tube section 3 will rapidly discharge condensers 21 and 23, which have previously been charged, through a current path which includes tube section 3, cathode resistor 11, and resistors 22 and 26, respectively. The resistance of resistor 14 should be large enough to prevent the potential across condensers 21 and 23 from building up again while tube section 3 is conductive. The potential of anode 10 is accordingly depressed in a very short time to such a value that space current ceases to flow through tube section 3. The potential of cathodes 4 and 7 accordingly is depressed to ground potential whereby tube section 2 again begins to conduct space current. A voltage drop is again developed across anode resistor 13 which is impressed through coupling condenser 15 upon control grid 8 of tube section 3 which prevents tube section 3 from conducting space current. Thus another cycle of operation is initiated.

In accordance with the present invention input pulses 35 of negative polarity illustrated in Fig. 2 are impressed through coupling condenser 18 on control grid 5 of tube section 2. The natural frequency of multivibrator 1 is arranged to be higher than the frequency of input pulses 35. Let it be assumed that an input pulse 35 occurs a short time after output pulse 36 has been developed across condenser 23 at the end of a cycle of operation of multivibrator 1. Accordingly, input pulse 35, which is of negative polarity, will extinguish tube section 2 so that tube section 3 becomes conducting again in view of the positive voltage impressed upon its control grid 8 through coupling condenser 15.

Thus another cycle of operation of multivibrator 1 is initiated and an output pulse indicated at 37 is developed across condenser 23 in response to input pulse 35. Tube section 3 will continue to conduct space current for a short time, that is, until condensers 21 and 23 have been discharged. This will depress the potential of anode 10 in the manner previously explained whereupon tube section 3 is extinguished while tube section 2 again begins to conduct space current. The circuit constants of multivibrator 1 are chosen in such a manner that tube section 3 will conduct for a time duration which is short against a cycle of operation.

During the time tube section 2 is conducting, a saw-tooth wave indicated at 38 is built up across coupling condenser 23. The wave-shaping network consisting of condenser 21 and resistor 22 in combination with coupling condenser 23 and grid leak resistor 26 will flatten saw-tooth wave 38 in the manner shown in Fig. 2. Every time tube section 3 begins to conduct space current, the potential across coupling condenser 23 will be depressed. After tube section 3 ceases to conduct space current, this potential will instantaneously rise again as illustrated in Fig. 2. Accordingly, immediately after tube section 3 ceases to conduct space current, the multivibrator is again in a condition to be triggered by an input pulse such as 35. It will, therefore, be appreciated that the time interval between output pulses 36 and 37 may be very short without endangering the stability of the circuit.

Two groups of output pulses are therefore developed by multivibrator 1. The first group of pulses comprises output pulses 36 and 40 each of which is developed at the end of a cycle of operation. The other group of output pulses comprises pulses 37 and 41 which are developed in response to successive input pulses 35. The time interval between output pulses 37 and 40, indicated at 42, corresponds to the natural frequency of multivibrator 1. On the other hand, the time interval between output pulses 36 and 37 indicated at 43 is determined by the difference between the frequency of the input pulses 35 and the natural frequency of multivibrator 1. The natural frequency of the multivibrator may be controlled by adjusting grid leak resistor 16. Hence by decreasing the resistance of resistor 16, output pulse 40 occurs sooner after the multivibrator has been triggered by input pulse 35, that is, the natural frequency is increased. On the other hand, when the resistance of grid leak resistor 16 is increased, the time interval 42 is increased so that the natural frequency of the multivibrator is reduced.

The voltage developed across coupling condenser 23 as illustrated at 39 in Fig. 2, that is, the multivibrator output is impressed upon control grid 24 of clipper and amplifier 25. The output signal of clipper 25 illustrated at 45 in Fig. 2 may be developed across anode resistor 31 and may be obtained from output lead 32. Clipper 25 is arranged so that it does not pass any voltage above a level indicated at 46 in Fig. 2 and therefore saw-tooth wave 38 does not appear in the output signal of clipper 25. It will be evident that amplifier 25 operates as a phase inverter so that output signal 45 is of positive polarity.

It will be appreciated that the pulse generator of the invention operates to develop two output pulses in response to one input pulse. The time interval 42 between two consecutive pulses 37 and 40 may be adjusted by varying grid leak resistor 16 in the manner explained hereinabove. A pulse generator of this type may, for example, be used in a television timing generator to replace the conventional delay circuits which have been previously suggested for the purpose of developing two output pulses having a predetermined time delay from one input pulse.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pulse generator comprising a self-oscillating multivibrator including a first and a second space discharge tube, each comprising a cathode, a control grid and an anode, a common cathode impedance in the cathode circuits of said tubes, means including a coupling condenser for coupling the grid of said second tube to the anode of said first tube, a grid leak impedance in the grid circuit of said second tube, an anode voltage supply connected individually to the anodes of said tubes through an anode impedance, means including a charging condenser connected in the anode circuit of said second tube and arranged to be charged through its associated anode impedance and discharged through said second tube, said second tube being arranged to be rendered conducting during a short period of a cycle of operation, means for impressing input pulses of negative polarity upon the grid of said first tube to render said second tube momentarily conducting in response to said input pulses and to initiate another cycle of operation, the frequency of said input pulses being lower than the natural frequency of said multivibrator, and means for deriving output pulses in response to the conduction of said second tube.

2. A pulse generator comprising a self-oscillating multivibrator including a first and a second space discharge tube, each comprising a cathode, a control grid and an anode, a common cathode impedance in the cathode circuits of said tubes, a coupling condenser for coupling the grid of said second tube to the anode of said first tube, an adjustable grid leak impedance in the grid circuit of said second tube for controlling the natural frequency of said multivibrator, an anode voltage supply connected individually to the anodes of said tubes through an anode impedance, means including a charging condenser and an impedance connected in the anode circuit of said second tube and arranged to be charged through its associated anode impedance and discharged through said second tube, said second tube being arranged to be rendered conducting during a short period of a cycle of operation, means for impressing input pulses of negative polarity upon the grid of said first tube to render said second tube momentarily conducting in response to said input pulses and to initiate another cycle of operation, the frequency of said input pulses being lower than said natural frequency, and means connected across said charging condenser for deriving output pulses.

3. A pulse generator comprising a self-oscillating multivibrator including a first and a second space discharge tube, each comprising a cathode, a control grid and an anode, means including a coupling condenser for coupling the grid of said second tube to the anode of said first tube, an adjustable impedance in the grid circuit of said second tube for establishing the natural frequency of said multivibrator, an anode impedance connected to the anodes of said tubes, means including a charging condenser connected in the anode circuit of said second tube and arranged to be charged through its associated anode impedance and discharged through said second tube, said second tube being arranged to be rendered conducting during a short period of a cycle of operation, means for impressing input pulses upon the grid of said first tube to render said second tube momentarily conducting in response to said input pulses and to initiate another cycle of operation, the frequency of said input pulses being lower than the natural frequency of said multivibrator, and means for deriving output pulses in response to the conduction of said second tube.

4. A pulse generator comprising a self-oscillating multivibrator including a first and a second space discharge tube, each comprising a cathode, a control grid and an anode, means for coupling the grid of said second tube to the anode of said first tube, an adjustable impedance in the grid circuit of said second tube for establishing the natural frequency of said multivibrator, an anode voltage supply connected to the anodes of said tubes through an anode impedance, means including a charging condenser connected in the anode circuit of said second tube and arranged to be charged from said anode supply and discharged through said second tube, said second tube being arranged to be rendered conducting during a short period of a cycle of operation, means for impressing input pulses at a frequency lower than said natural frequency upon the grid of said first tube to render said second tube momentarily conducting in response to said input pulses and to initiate another cycle of operation, and means for deriving output pulses in response to the conduction of said second tube.

ARTHUR R. HAVENS.

REFERENCES CITED

The following references are of record in the file of this patent:

UNITED STATES PATENTS

| Number | Name | Date |
|---|---|---|
| 2,402,169 | Lifschutz | June 18, 1946 |
| 2,403,984 | Koenig, Jr. et al. | July 16, 1946 |
| 2,418,127 | Labin | April 1, 1947 |
| 2,418,268 | Lawson | April 1, 1947 |
| 2,452,549 | Cleeton | Nov. 2, 1948 |
| 2,471,413 | Cleeton | May 31, 1949 |